United States Patent
Chin et al.

(10) Patent No.: US 8,901,439 B2
(45) Date of Patent: Dec. 2, 2014

(54) INTEGRATED CIRCUIT PACKAGE SYSTEM WITH WINDOW OPENING

(75) Inventors: Chee Keong Chin, Butterworth (MY); Yu Feng Feng, Shanghai (CN); Guo Qiang Shen, Shanghai (CN)

(73) Assignee: STATS ChipPAC Ltd., Singapore (SG)

( * ) Notice: Subject to any disclaimer, the term of this patent is extended or adjusted under 35 U.S.C. 154(b) by 1411 days.

(21) Appl. No.: 11/465,744

(22) Filed: Aug. 18, 2006

(65) Prior Publication Data

US 2008/0041964 A1 Feb. 21, 2008

(51) Int. Cl.
*H01R 13/502* (2006.01)
*G06K 19/07* (2006.01)
*G06K 19/077* (2006.01)

(52) U.S. Cl.
CPC .......... *G06K 19/07* (2013.01); *G06K 19/07732* (2013.01)
USPC ............................ 174/560; 361/737; 257/680

(58) Field of Classification Search
USPC ............ 361/737; 174/520, 559, 560; 257/680
See application file for complete search history.

(56) References Cited

U.S. PATENT DOCUMENTS

| | | | |
|---|---|---|---|
| 6,215,665 B1 * | 4/2001 | Martin | 361/737 |
| 6,370,038 B1 * | 4/2002 | Miyake et al. | 361/814 |
| 6,381,143 B1 | 4/2002 | Nakamura | |
| 6,627,814 B1 * | 9/2003 | Stark | 174/539 |
| 6,988,668 B2 | 1/2006 | Osako et al. | |
| 7,055,757 B2 | 6/2006 | Nishizawa et al. | |
| 7,314,388 B2 * | 1/2008 | Yamada et al. | 439/630 |
| 2006/0072368 A1 | 4/2006 | Koh et al. | |
| 2006/0076662 A1 | 4/2006 | Kuo et al. | |

OTHER PUBLICATIONS

The Free Online Dictionary by Farlex (www.thefreedictionary.com/top), p. 1, Dec. 12, 2008.*

* cited by examiner

*Primary Examiner* — Hung Ngo
(74) *Attorney, Agent, or Firm* — Ishimaru & Associates LLP

(57) ABSTRACT

An integrated circuit package system includes a bottom lid, a base integrated circuit over the bottom lid, and a top lid with an integrated circuit window opening over the bottom lid.

20 Claims, 2 Drawing Sheets

INTEGRATED CIRCUIT PACKAGE SYSTEM WITH WINDOW OPENING

TECHNICAL FIELD

The present invention relates generally to integrated circuit systems, and more particularly to a system for integrated circuit package with window opening.

BACKGROUND ART

Products using electronic devices and systems have continued to increase in quantity as well as applications across the aspects of our daily lives. With the ever-increasing numbers and scope, the electronic devices further demand increases in storing information and programs. Some of the electronic devices have developed considerable computing ability even within very small areas and dimensional form factors to the point that these devices can process significant amounts of data or execute sizable programs. Continued development of new application types or functions requires the ability to accommodate additional data or programs for continued use of the existing electronic devices or device form factors.

Wide spread use of portable host computers, including laptops, notebooks, palmtops, personal digital assistants, and handheld computers, has been severely hampered by limited capabilities for expansion or customization. Expansion and application customization has been performed through very limited slots for removable expansion modules for I/O, I/O adapters, memories, and memory adapters. Memory expansion modules have included DRAM, SRAM, ROM, and Flash technologies. I/O expansion modules have included dedicated peripherals, networking, modems, wireless communications, serial I/O, and bar code and other scanners. Having very limited slots meant memory and memory related expansion has been limited to standard product dimensions.

One of the current memory modules is the Multi Media card (MMC) at 1.4 mm thick, 24 mm wide, and 32 mm long. Another current memory module, the Secure Digital memory module (SD memory card, SD memory, or SD) is an extension of the Multi Media card standard. The Secure Digital standard adds cryptographic security, up to four times improvement in peak data transfer rate, mechanical write-protect switch, and improved ESD tolerance. Physically, the Secure Digital memory module asymmetrically modifies the 1.4 mm by 24 mm wide Multi Media card form factor by augmenting the bottom (contact) side with a 0.7 mm thick and 22.5 mm wide area for an overall module thickness of 2.1 mm. The Secure Digital memory module has the same 32 mm length as the Multi Media card.

These dimensional standards severely constrain the amount of memory that can be contained within the current form factors for memory modules. Improvements in the integrated circuit memory technology primarily with respect to circuit density, cannot keep pace with the demands for more memory capacity in the standard form factors. These demands are such that several attempts have been made to increase the number of integrated circuit memory devices within the current memory modules. These attempts to increase the number of integrated circuits have resulted in significant new challenges and issues including but not limited to non-standard dimensional form factors and integrated circuit mounting complexity resulting in decreased performance and increased costs.

Across virtually all applications, there continues to be growing demand for increasing capacity and increasing performance of integrated circuit memory. The seemingly endless restrictions and requirements are no more visible than with products in our daily lives. Smaller and denser integrated circuits are expected in many portable electronic products as well as in many larger electronic systems. As the demand grows for smaller electronic products with more features, manufacturers are seeking ways to include more capacity within the same product dimensional form factors.

Thus, a need still remains for an integrated circuit package system to provide improved capacity and manufacturing yield within standard form factors. In view of the increasing demand for improved integrated circuits and particularly more capacity in small products at lower costs, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides bottom lid, mounting a base integrated circuit over the bottom lid, and attaching a top lid with an integrated circuit window opening over the bottom lid.

Certain embodiments of the invention have other aspects in addition to or in place of those mentioned or obvious from the above. The aspects will become apparent to those skilled in the art from a reading of the following detailed description when taken with reference to the accompanying drawings.

BEST MODE FOR CARRYING OUT THE INVENTION

Figure 1:
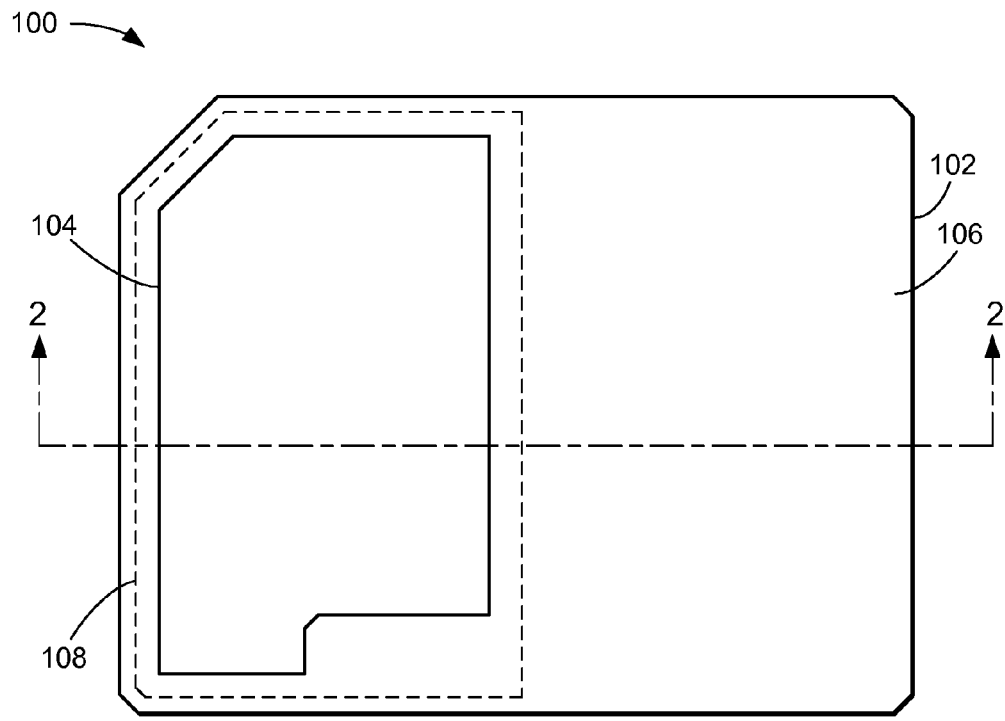
FIG. 1 is a top view of an integrated circuit package system in an embodiment of the present invention.

In the following description, numerous specific details are given to provide a thorough understanding of the invention. However, it will be apparent that the invention may be practiced without these specific details. In order to avoid obscuring the present invention, some well-known circuits, and process steps are not disclosed in detail.

Likewise, the drawings showing embodiments of the apparatus/device are semi-diagrammatic and not to scale and, particularly, some of the dimensions are for the clarity of presentation and are shown greatly exaggerated in the drawing FIGS. Similarly, although the sectional views in the drawings for ease of description show the invention with surfaces as oriented downward, this arrangement in the FIGS. is arbitrary and is not intended to suggest that invention should necessarily be in a downward direction. Generally, the device can be operated in any orientation. In addition, the same numbers are used in all the drawing FIGS. to relate to the same elements.

The term "horizontal" as used herein is defined as a plane parallel to the conventional plane or surface of the invention, regardless of its orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane. The term "on" refers to direct contact among the elements.

The term "processing" as used herein includes deposition of material or photoresist, patterning, exposure, development, etching, cleaning, and/or removal of the material or photoresist as required in forming a described structure.

Referring now to FIG. 1, therein is shown a top view of an integrated circuit package system 100 in an embodiment of the present invention. The integrated circuit package system 100, such as a Secure Digital memory module or a Multi Media card, includes a top lid 102 having an integrated circuit window opening 104 for increasing memory capacity. The integrated circuit window opening 104 can provide an opening through the top lid 102. The top lid 102 with the integrated circuit window opening 104 can provide significant additional space compared to the top lid 102 without the integrated circuit window opening 104.

The top lid 102 includes an outer surface 106 that forms an upper portion of an outer body of the integrated circuit package system 100. A cover 108, such as a label, can be attached over the integrated circuit window opening 104. The cover 108 can be attached over the outer surface 106 of the top lid 102 to protect the integrated circuit window opening 104 and any components below. The upper portion of the outer body of the integrated circuit package system 100 can include the cover 108 and the outer surface 106 of the top lid 102.

For illustrative purposes, the integrated circuit package system 100 is shown in a shape of the secure digital memory module, although it is understood that any package or memory module may be used. Further the integrated circuit window opening 104 is shown having a shape of the top lid 102 of the secure digital memory module, although it is understood that any shape may be used.

Figure 2:
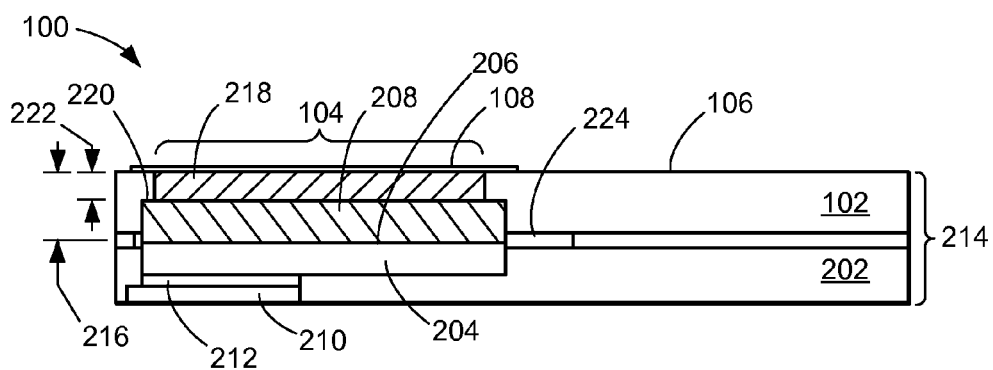
FIG. 2 is a cross-sectional view of the integrated circuit package system along 2-2 of FIG. 1.

Referring now to FIG. 2, therein is shown a cross-sectional view of the integrated circuit package system 100 along line 2-2 of FIG. 1. The integrated circuit package system 100 includes the top lid 102 with the integrated circuit window opening 104, and the outer surface 106. The outer surface 106 can include the cover 108 over the integrated circuit window opening 104 to protect any components below: Also included are a bottom lid 202, a substrate 204 with a mounting surface 206 for a base integrated circuit 208, external connectors 210, and an attachment layer 212. The base integrated circuit 208 is at least partially in the ton lid 102 under the integrated circuit window opening 104, as shown. An integrated circuit cavity 214 having a depth 216, such as one and fourteen hundredths mm, provides for a stacked integrated circuit 218. The depth 216 of the integrated circuit cavity 214 provides a region between the mounting surface 206 of the substrate 204 and the outer surface 106 of the top lid 102.

The integrated circuit package system 100 with the integrated circuit window opening 104 can provide fifty percent more of the depth 216 than the top lid 102 without the integrated circuit window opening 104. A step 220 having a step dimension 222, such as thirty-eight hundredths mm, holds the base integrated circuit 208 inside the top lid 102 and the bottom lid 202. The step 220 can provide planar dimensions greater than planar dimensions of the integrated circuit window opening 104 to provide a surface for the top lid 102 and the bottom lid 202 to overlap and maintain the positional integrity of the base integrated circuit 208. The step dimension 222 can provides a region for the stacked integrated circuit 218. The planar dimensions of the integrated circuit window opening 104 can be equal to or greater than planar dimensions of the stacked integrated circuit 218.

The top lid 102 attaches to the bottom lid 202 at supports 224 or a top perimeter (not shown) of the top lid 102 and a bottom perimeter (not shown) of the bottom lid 202. The supports 224 can be formed on the top lid 102 or the bottom lid 202. The supports 224, the top perimeter, and the bottom perimeter provide structural integrity of the integrated circuit package 100 and for any of the components below. Attaching the top lid 102 on the bottom lid 202 with the external connectors 210 and the attachment layer 212, provides the integrated circuit package system 100 with dimensions conforming to an application form factor, such as a Secure Digital memory module or a Multi Media card.

It has been discovered that more than one of the base integrated circuit 208 and more than one of the stacked integrated circuit 218 can be attached in the integrated circuit package system 100. The additional numbers of the base integrated circuit 208 or the additional numbers of the stacked integrated circuit 218 provides increased memory storage capacity.

For illustrative purposes, one of the base integrated circuit 208 and one of the stacked integrated circuit 218 are shown, although it is understood that any number of the base integrated circuit 208 and any number of the stacked integrated circuit 218 may be used. Further, for illustrative purposes, the integrated circuit window opening 104 is shown in the top lid 102, although it is understood that the bottom lid 202 may have another of the integrated circuit window opening 104.

Figure 3:
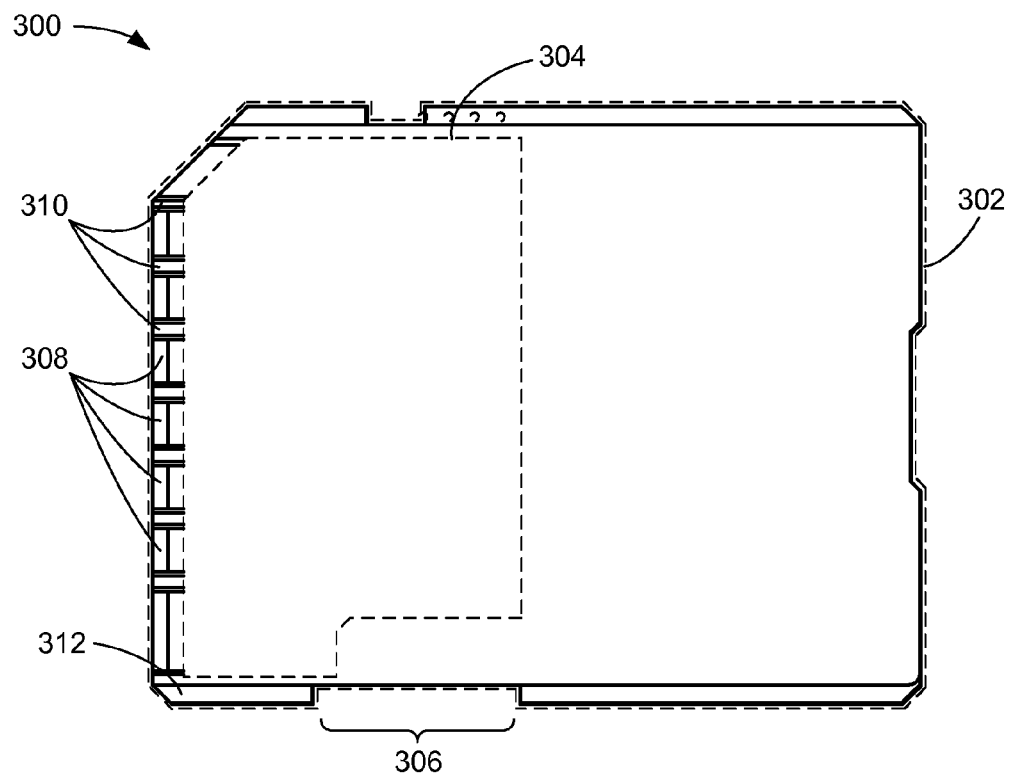
FIG. 3 is a plan view of the integrated circuit package system.

Referring now to FIG. 3, therein is shown a plan view of an integrated circuit package system 300 in an alternative embodiment of the present invention. The integrated circuit package system 300, such as a Secure Digital memory module or a Multi Media card, includes a top lid 302 having an integrated circuit window opening 304 for increased memory capacity. The integrated circuit window opening 304 can provide an opening through the top lid 302. The top lid 302 with the integrated circuit window opening 304 can provide significant additional space compared to the top lid 302 without the integrated circuit window opening 304.

A recessed region 306 can provide a switch (not shown) for a function, such as write protection of memory in the integrated circuit package system 300. The recessed region 306 can be formed in the top lid 302 and a bottom lid 312 to provide the recessed region 306 for the switch within outer dimensions of the integrated circuit package system 300. External connectors 308 can be placed between ribs 310 of the bottom lid 312. The external connectors 308 provide electrical connection to a next level system such as a personal electronic device. The ribs 310 can provide electrical isolation as well as positional integrity to the each of the external connectors 308.

It has been discovered that the integrated circuit package system 300 provides an increase in usable area of the top lid 302 of approximately one and a half times. Further, it has been discovered that the integrated circuit package system 300 provides additional area for memory storage capacity.

For illustrative purposes, the integrated circuit package system 300 is shown in a shape of the secure digital memory module, although it is understood that any package or memory module may be used. Further the integrated circuit window opening 304 is shown having a shape of the top lid 302 of the secure digital memory module, although it is understood that any shape may be used.

Figure 4:
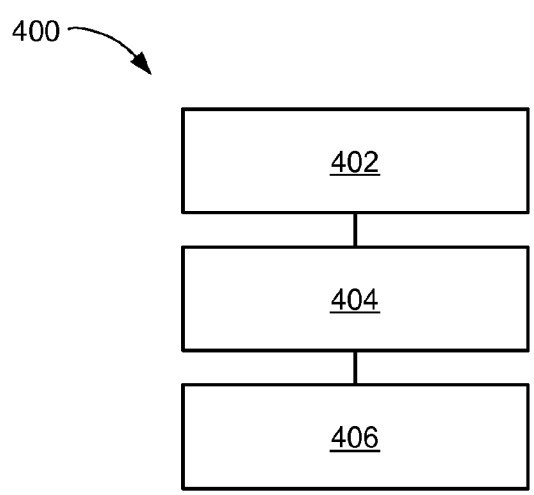
FIG. 4 is a flow chart of an integrated circuit package system for manufacturing the integrated circuit package system in an embodiment of the present invention.

Referring now to FIG. 4, therein is shown a flow chart of an integrated circuit package system 400 for manufacturing the integrated circuit package system 100 in an embodiment of the present invention. The system 400 includes providing a bottom lid in a block 402; mounting a base integrated circuit over the bottom lid in a block 404; and attaching a top lid with an integrated circuit window opening over the bottom lid in a block 406.

In greater detail, a method to fabricate the integrated circuit package system 100, in an embodiment of the present invention, is performed as follows:

1. Forming a bottom lid with external connectors. (FIG. 2)
2. Mounting a base integrated circuit having a step over the bottom lid. (FIG. 2)
3. Attaching a top lid with an integrated circuit window opening over the bottom lid providing an integrated circuit cavity. (FIG. 2)

It has been discovered that the present invention thus has numerous aspects.

An aspect is that the present invention provides the integrated circuit window opening. The integrated circuit window opening is formed in the top lid. The integrated circuit window opening can provide an opening through the top lid.

Another aspect is that the present invention provides the integrated circuit cavity. The integrated circuit cavity is formed with the bottom lid, the top lid, and the integrated circuit window opening in the integrated circuit package system.

Yet another aspect is that the present invention provides the step including the step dimension. The step provides a surface that is parallel to the top lid and the bottom lid of the integrated circuit package system.

It has been discovered that the disclosed structure provides for the integrated circuit cavity having the depth of approximately 1.14 mm. The depth of the integrated circuit cavity with the integrated circuit window opening can be about fifty percent more than a depth without the integrated circuit window opening of approximately 0.76 mm.

It has also been discovered that the disclosed structure provides for stacking. The stacked integrated circuit and the base integrated circuit can be stacked within the integrated circuit package system. The integrated circuit die can be stacked in the typically smaller dimension rather than mounted adjacent to one another across the typically larger planar dimension.

Yet another discovery is that the disclosed structure provides increased memory storage capacity. The increased amount of the depth of the integrated circuit cavity provides for more than one of the base integrated circuit or the stacked integrated circuit. Stacking the integrated circuit provides additional memory within the standard form factors.

Yet another discovery is that that the disclosed structure provides holding of the base integrated circuits inside the lids. The step provides a surface for the top lid and the bottom to overlap the base integrated circuit for the purpose of maintaining the positional integrity of the base integrated circuit.

Yet another discovery of the disclosed structure is improved electrical performance. The improved electrical performance is provided by the close proximity of the base integrated circuit and the stacked integrated circuit. In some cases, electrical interconnection can be minimized providing optimal electrical performance.

Yet another discovery of the disclosed structure is compatibility with various substrate types. The base integrated circuit is compatible with various assembly processes and can be attached to several substrates providing the flexibility to optimize or balance costs, manufacturability, and performance.

Yet another discovery of the disclosed structure is compatibility with volume assembly technology. The use of volume assembly technology can improve product costs, production cycle time, and performance. Compatibility with volume production often includes robust specifications with sufficient margin in key areas.

These and other valuable aspects of the present invention consequently further the state of the technology to at least the next level.

Thus, it has been discovered that the integrated circuit package system method and apparatus of the present invention furnish important and heretofore unknown and unavailable solutions, capabilities, and functional aspects. The resulting processes and configurations are straightforward, cost-effective, uncomplicated, highly versatile, and effective, can be implemented by adapting known technologies, and are thus readily suited for efficient and economical manufacturing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

What is claimed is:

1. A method of manufacturing an integrated circuit package system comprising:
   providing a bottom lid;
   mounting a base integrated circuit over the bottom lid; and
   attaching a top lid with an integrated circuit window opening over the bottom lid with the base integrated circuit at least partially in the top lid under the integrated circuit window.

2. The method as claimed in claim 1 wherein attaching a top lid with an integrated circuit window opening includes attaching the top lid on the bottom lid.

3. The method as claimed in claim 1 further comprising mounting a stacked integrated circuit over the base integrated circuit.

4. The method as claimed in claim 1 further comprising attaching a substrate over the bottom lid.

5. The method as claimed in claim 1 further comprising attaching a cover over the base integrated circuit.

6. A method of manufacturing an integrated circuit package system comprising:
   forming a bottom lid with external connectors:
   mounting a base integrated circuit having a step over the bottom lid; and
   attaching a top lid with an integrated circuit window opening over the bottom lid with the base integrated circuit at least partially in the top lid under the integrated circuit window.

7. The method as claimed in claim 6 wherein attaching the top lid with the integrated circuit window opening includes forming the integrated circuit window opening having planar dimensions equal to or greater than planar dimensions of a stacked integrated circuit.

8. The method as claimed in claim 6 wherein attaching the top lid with an integrated circuit window opening includes forming an opening having approximately 1.14 mm between a mounting surface and an outer surface of the top lid.

9. The method as claimed in claim 6 wherein forming the bottom lid with external connectors includes forming connectors of a secure digital memory module.

10. The method as claimed in claim 6 further comprising forming a step over the base integrated circuit.

11. An integrated circuit package system comprising:
a bottom lid;
a base integrated circuit over the bottom lid; and
a top lid with an integrated circuit window opening over the bottom lid with the base integrated circuit at least partially in the top lid under the integrated circuit window.

12. The system as claimed in claim 11 wherein a top lid with an integrated circuit window opening includes the top lid on the bottom lid.

13. The system as claimed in claim 11 further comprising a stacked integrated circuit over the base integrated circuit.

14. The system as claimed in claim 11 further comprising a substrate over the bottom lid.

15. The system as claimed in claim 11 further comprising a cover over the base integrated circuit.

16. The system as claimed in claim 11 wherein:
the bottom lid is the bottom lid with external connectors;
the base integrated circuit is the base integrated circuit having a step over the bottom lid; and
the top lid is the top lid with an integrated circuit window opening over the bottom lid providing an integrated circuit cavity.

17. The system as claimed in claim 16 wherein the top lid with the integrated circuit window opening includes the integrated circuit window opening having planar dimensions equal to or greater than planar dimensions of a stacked integrated circuit.

18. The system as claimed in claim 16 wherein the top lid with an integrated circuit window opening includes an opening having approximately 1.14 mm between a mounting surface and an outer surface of the top lid.

19. The system as claimed in claim 16 wherein the bottom lid with external connectors includes connectors of a secure digital memory module.

20. The system as claimed in claim 16 further comprising a step over the base integrated circuit.

* * * * *